June 15, 1965 J. R. KOTLARSKI 3,189,761
MONOSTABLE MULTIVIBRATOR WITH JITTER REDUCTION MEANS
Filed Nov. 29, 1962 2 Sheets-Sheet 1

Joseph R. Kotlarski,
INVENTOR
BY.
Paul M. Coble
ATTORNEY.

Joseph R. Kotlarski
INVENTOR.
BY.
Paul M. Coble
ATTORNEY

United States Patent Office 3,189,761 Patented June 15, 1965

3,189,761

MONOSTABLE MULTIVIBRATOR WITH JITTER REDUCTION MEANS

Joseph R. Kotlarski, Palos Verdes, Calif., assignor to Hughes Aircraft Company, Culver City, Calif., a corporation of Delaware Filed Nov. 29, 1962, Ser. No. 240,990
4 Claims. (Cl. 307—88.5)

Figure 1:
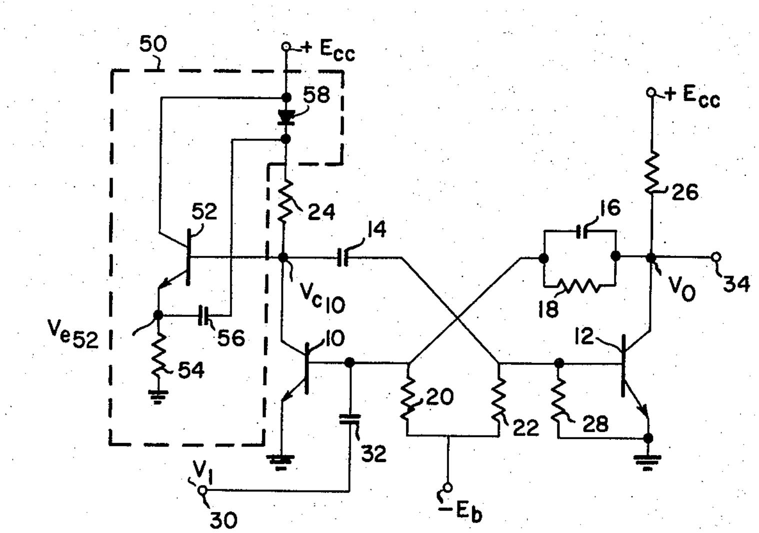

The present invention relates to pulse generators, and more particularly relates to a monostable multivibrator for generating an output pulse of precise duration and with a minimum amount of jitter at its trailing edge.

On account of their simplicity, high pulse repetition frequencies, and readily variable pulse widths and amplitudes, RC-type monostable, or "one-shot," multivibrators have had wide application in the generation of pulses of predetermined amplitude and precise pulse width. A transistorized RC monostable multivibrator may comprise first and second transistors, each having its collector coupled to the base of the other transistor in a regenerative fashion so that while the first transistor is conductive, the second transistor is cut off, and vice versa. Application of an input trigger pulse to the base of the first (normally conductive) transistor cuts off this transistor, developing a transient signal which is coupled to the base of the second transistor to render that transistor conductive, and thereby initiating the output pulse. The second transistor is maintained heavily conductive as long as the exponentially decaying drive current to its base is above a given clamp level, and as long as the second transistor is sufficiently conductive, the regenerative signal from its collector to the base of the first transistor maintains the first transistor cut off. When the drive current to the base of the second transistor falls below the clamp level, the collector current of the second transistor starts to decrease, and termination of the output pulse begins. After further decreases in the base drive and collector currents of the second transistor, a regeneration level is reached in which the signal from the collector of the second transistor to the base of the first transistor is no longer able to maintain the first transistor cut off. The first transistor again becomes conductive, and a regenerative signal from the collector of the first transistor to the base of the second transistor cuts off the second transistor, thereby completing the termination of the output pulse. A circuit of this type is described in detail in an article by J. J. Suran, "Transistor Monostable Multivibrators for Pulse Generation," Proceedings of the I.R.E., June 1958, pages 1260–1271.

As is brought out in the aforementioned article, on account of the time delay between when the exponentially decaying drive current to the base of the second transistor reaches the respective clamp and regeneration levels, substantial rounding of the trailing edge of the output pulse occurs. Moreover, the decreasing derivative of the base drive current is also responsible for considerable trailing edge jitter, i.e. variations in pulse width by shifting the point in time at which the trailing edge of the output pulse begins. This shifting may be caused by slight changes in the clamp or regeneration levels resulting from such factors as noise, temperature changes, or bias supply variations.

It is possible to minimize the jitter effect by constraining the logarithmic argument in the equation defining the time delay (pulse width) of the circuit to a predetermined level which assures that the derivative (slope) of the exponentially decaying drive current curve in the region between the clamp and regeneration levels is relatively large. However, this method does not eliminate the jitter, which may still be excessive for some applications of the circuit.

A further jitter reduction technique is described in some detail in the aforementioned article. According to this method, an inductor is inserted in the collector circuit of the first (normally conductive) transistor so that the drive current to the base of the second transistor is a damped sinusoidal response of an RLC network. The decreasing derivative of an exponential decay is thus combined with the increasing derivative of a cosine function to produce a resultant base drive current with a larger derivative in the region between the clamp and regeneration levels. In implementing this method, it is necessary to select the values of the elements comprising the RLC network so that the time constant of the exponential decay is much greater than both the desired width of the output pulse and the period corresponding to the LC resonant frequency.

It will be apparent that when jitter reduction is attempted by means of the aforedescribed RLC technique, the values of resistance, capacitance and inductance in the base drive circuit for the second transistor are indeed critical, and thus the range of operation frequencies for the circuit is limited by the range of values of these elements which may be used. For example, for relatively long pulse widths the value of inductance necessary for effective jitter reduction by this method becomes unreasonably large. Therefore, the RLC technique is practical for only a limited range of pulse widths and only limited values of circuit components.

Accordingly, it is an object of the present invention to provide a monostable multivibrator with novel and improved means for reducing the jitter at the trailing edge of its output pulse.

It is a further object of the present invention to provide a monostable multivibrator for responding to a trigger signal to generate output pulses of accurately defined pulse width and an extremely short trailing edge.

It is a still further object of the present invention to provide a transistorized monostable multivibrator circuit which furnishes output pulses having minimum trailing edge jitter, which circuit does not require the use of an inductor, and which circuit is operable throughout a wide range of pulse widths and circuit element values.

It is still another object of the present invention to provide a simple and reliable transistorized ramp function generator.

In accordance with the present invention special jitter reduction circuitry is incorporated into a monostable multivibrator of the type described above. The jitter reduction circuitry includes a signal translating device having a gain of essentially unity, which in a preferred embodiment is a transistor connected in an emitter follower configuration. The signal translating device causes a linearly decreasing drive current to be applied to the base of the second transistor during the interval of time in which that transistor is conductive of current. This reduces the time interval between the respective times when the drive current traverses the clamp and regeneration levels, i.e., the time interval during which the multivibrator is in a transition state while reverting from its unstable to its stable state, thereby enabling the multivibrator to provide an output pulse with a sharper trailing edge and with reduced trailing edge jitter.

Figure 2:
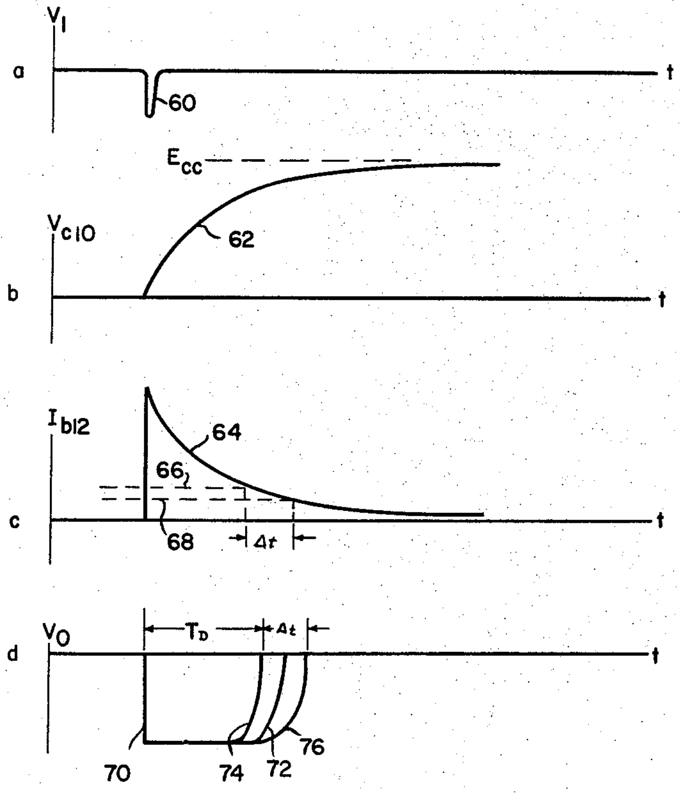
Figure 3:
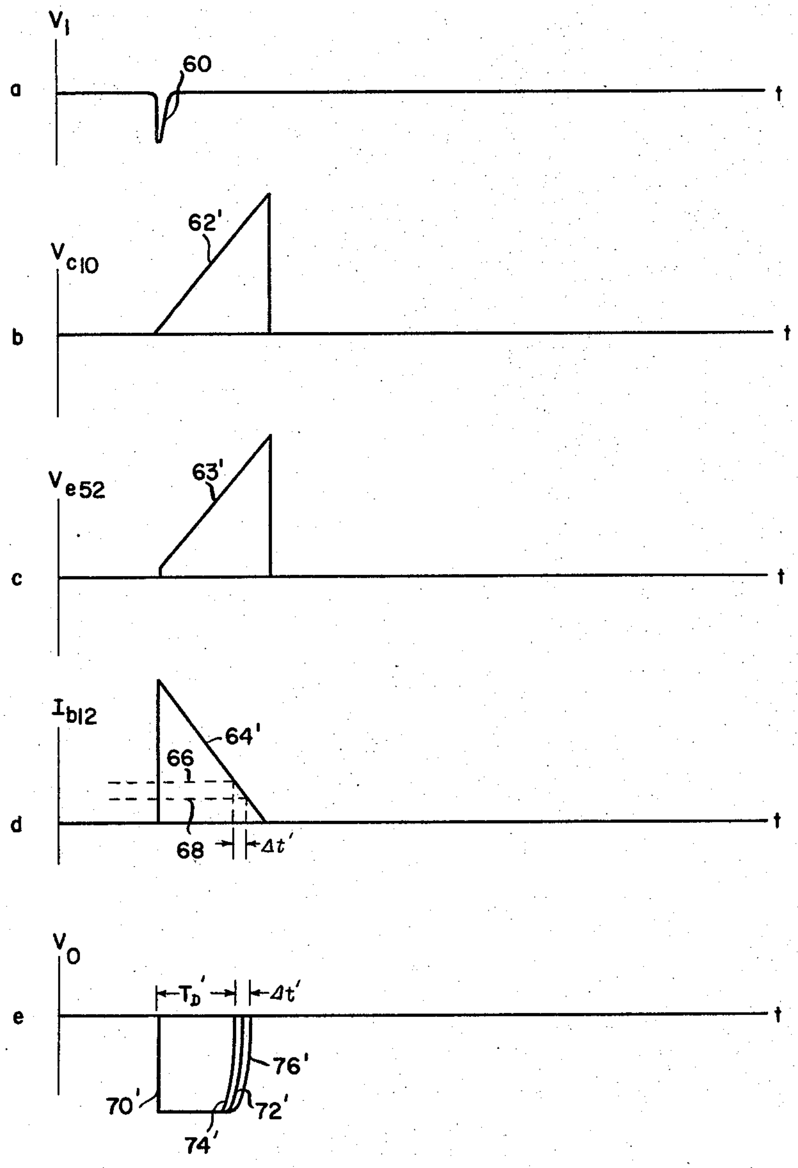

Additional objects, advantages and characteristic features of the present invention will become readily apparent from the following detailed description of a preferred embodiment thereof when taken in conjunction with the appended drawings in which:

FIG. 1 is a schematic circuit diagram illustrating a monostable multivibrator circuit with improved jitter reduction means provided according to the present invention;

FIGS. 2(*a*)–(*d*) are graphs of current and voltage waveforms at various points in the circuit of FIG. 1 except without the jitter reduction circuitry of the present invention; and FIGS. 3(*a*)–(*e*) are graphs of current and voltage waveforms at various points in the circuit of FIG. 1.

Referring now to FIG. 1, a monostable multivibrator circuit of the type with which the present invention is concerned may be seen to comprise first and second similar amplifying devices which are illustrated as NPN transistors 10 and 12, respectively. It is to be understood, however, that other types of amplifying devices, for example, PNP transistors or vacuum tubes may be employed instead. A regenerative loop is provided by connecting the collector of the first transistor 10 to the base of the second transistor 12 through a capacitor 14, and connecting the collector of the second transistor 12 to the base of the first transistor 10 through a parallel network consisting of a capacitor 16 and a resistor 18. The bases of the transistors 10 and 12 are connected via resistors 20 and 22, respectively, to a common terminal providing a bias voltage of $-E_b$. The emitters of the transistors 10 and 12 are connected to a level of reference potential designated as ground, while the collectors of these transistors are connected through respective resistors 24 and 26 to a terminal supplying a bias potential of $+E_{cc}$, with a resistor 28 being connected between the base and emitter of the transistor 12. An input terminal 30, adapted to receive a trigger pulse, is connected to the base of the transistor 10 through a coupling capacitor 32, while an output terminal 34 is connected to the collector of the transistor 12.

The circuit heretofore described is conventional, and for a more detailed description, reference may be made to the article identified above. However, in order to facilitate a greater understanding of the present invention, the operation of the portion of the circuit of FIG. 1 heretofore described will now be briefly discussed with reference to FIG. 2. Under quiescent conditions (the stable state of the circuit) the transistor 10 is heavily conductive, while the transistor 12 is cut off. When a negative trigger pulse, such as the pulse 60 of FIG. 2(*a*), is applied to the input terminal 30 to place the circuit in an unstable state, the base of the transistor 10 is driven negative, thereby cutting off the transistor 10. The voltage $V_{C_{10}}$ at the collector of the transistor 10 then rises toward the value $E_{cc}$, as shown by the waveform 62 of FIG. 2(*b*). This potential rise is reflected through the capacitor 14 to the transistor 12, causing the transistor 12 to become heavily conductive. The potential $V_o$ at the collector of the transistor 12 is thus lowered, thereby initiating the output pulse. Charging of the capacitor 14 provides an exponentially decaying step drive current $I_{b_{12}}$, illustrated by the waveform 64 of FIG. 2(*c*), to the base of the transistor 12. As long as the base current to the transistor 12 is greater than a given clamp level, illustrated by the dashed line 66 in FIG. 2(*c*), heavy current flow through the transistor 12 may be maintained, and the resulting lowered potential at the collector of the transistor 12 is reflected through the parallel combination of the capacitor 16 and the resistor 18 to the base of the transistor 10 to maintain the transistor 10 in nonconductive state. When the drive current $I_{b_{12}}$ to the base of the transistor 12 has decayed below the clamp level 66, the base current is no longer sufficient to maintain the transistor 12 heavily conductive. The circuit is thus placed in a transition state in which the collector current of the transistor 12 decreases, causing the potential $V_o$ at the collector of transistor 12 to rise and thereby initiating the trailing edge of the output pulse at the terminal 34. This rise in potential is reflected at the base of the transistor 10, and when the base drive current $I_{b_{12}}$ has decreased below a regeneration level, indicated by the dashed line 68 in FIG. 2(*c*), the potential at the base of the transistor 10 has increased sufficiently to render the transistor 10 conductive. This further reduces the drive current $I_{b_{12}}$ to the base of the transistor 12, cutting off the transistor 12 and causing its collector potential $V_o$ to increase to essentially $+E_{cc}$, thereby terminating the output pulse.

It may be observed from FIG. 2(*c*) that a substantial amount of time $\Delta t$ elapses during which the circuit is in a transition state while reverting from its unstable state to its stable state, i.e., after the decaying drive current $I_{b_{12}}$ reaches the clamp level 66 and before it reaches the regeneration level 68. As has been mentioned above this time delay $\Delta t$ not only is responsible for extending the trailing edge of the output pulse, but it also introduces an indeterminancy (jitter) in the time at which the trailing edge of the output pulse occurs. As is shown in FIG. 2(*d*) an output pulse 70 is provided, with a trailing edge 72 which may occur anywhere in time between the edge 74 and the edge 76, as determined by the particular environmental conditions to which the circuit is subjected. Thus, the output pulse 70 may be seen to have a duration of time $T_D$ plus an uncertainty $\Delta t$.

The present invention provides a monostable multivibrator of the type described above which develops output pulses with a much sharper trailing edge and with a vastly reduced amount of trailing edge jitter. This is accomplished by the incorporation of novel jitter reduction circuitry into the monostable multivibrator circuit described above, with the jitter reduction circuitry added in accordance with the present invention being illustrated within the dashed lines designated generally by the numeral 50 in FIG. 1. The circuitry 50 includes a signal translating device having a gain of essentially unity, which in a preferred embodiment of the invention is illustrated as an NPN transistor connected in an emitter follower configuration. More specifically, the base of an emitter follower transistor 52 is connected to the junction between the collector of the transistor 10 and one terminal of the collector resistor 24; while the emitter of the transistor 52, which is grounded through a resistor 54, is coupled to the other terminal of the collector resistor 24 by means of the capacitor 56. The junction between the capacitor 56 and the resistor 24 is connected to the cathode of a diode 58, the anode of which is connected to the collector of the transistor 52, as well as to a terminal supplying a collector bias voltage of $+E_{cc}$.

In the operation of the circuit of the present invention, now to be described with reference to the signal waveforms illustrated in FIG. 3, the quiescent condition of the monostable multivibrator is the same as that described above, i.e., the transistor 10 is heavily conductive while the transistor 12 is cut off. Upon the application of a negative trigger pulse 60 [FIG. 3(*a*)] to the input terminal 30, the transistor 10 is cut off, and the resulting drop in the collector current through the resistor 24 causes the voltage $V_{C_{10}}$ at the collector of the transistor 10 to rise. However, the voltage $V_{C_{10}}$ is now applied to the base of the emitter follower transistor 52 as well as to the collector-connected terminal of the resistor 24. The resulting voltage $V_{e_{52}}$ at the emitter of the transistor 52 is applied to the other terminal of the collector resistor 24. Since the voltage $V_{e_{52}}$ is approximately the same as the voltage $V_{C_{10}}$ (on account of the essentially unity gain of the emitter follower) and since these two voltages are applied across the collector resistor 24, an essentially constant voltage is maintained across the resistor 24, resulting in an essentially constant current flow through the resistor 24. On account of the emitter follower action, the collector voltage $V_{C_{10}}$ does not increase exponentially as does the waveform 62 of FIG. 2(*b*), but rather increases essentially linearly as shown by the waveform 62′ of FIG. 3(*b*). A similar ramp waveform 63′, which is illustrated in FIG. 3(*c*), is provided at the emitter of the transistor 52.

After the transistor 10 has been rendered nonconductive, essentially all of the current flowing through resistor 24 flows to the capacitor 14, providing essentially constant current flow to the capacitor 14. The linearly increasing voltage $V_{C_{10}}$ at the collector of transistor 10 causes the capacitor 14 to charge linearly, resulting in a linearly decreasing voltage at the base of transistor 12. This provides a base drive current $I_{b_{12}}$ to the transistor 12 which decreases linearly as shown by the waveform 64′ of FIG. 3(*d*).

It may be observed that the slope of the curve for the drive current $I_{b_{12}}$ to the base of transistor 12 is constant [FIG. 3(*d*)] for the improved circuit illustrated in FIG. 1 rather than decreasing as a function of time [FIG. 2(*c*)] for the unimproved circuit discussed above. Therefore, the time lapse $\Delta t'$ between the respective times when the drive current traverses the clamp and regeneration levels 66 and 68 in the improved circuit of FIG. 1 is considerably less than the corresponding time delay $\Delta t$ in the unimproved circuit. The output pulse 70′ provided by the improved circuit of FIG. 1 is illustrated in FIG. 3(*e*), and it may be seen that the trailing edge 72′ of the pulse 70′ may occur anywhere in time between the edges 74′ and 76′ which define the outer limits for the indeterminate time interval $\Delta t'$. It will be apparent that in view of the vastly reduced indeterminate time $\Delta t'$ in which the trailing edge 72′ may occur, an output pulse with a sharper trailing and with reduced trailing edge jitter is provided by the circuit of the present invention.

For a symmetrical circuit in which substantially identical transistors 10 and 12 are employed, the duration $T_D'$ of the output pulse 70′ may be determined by the relation:

$$T_D' \simeq R_1 C\left[1 - \frac{I_2}{\beta I_1} - \frac{(V_{be}+E_b)}{R_2 I_1}\right]$$

where $R_1$ is the resistance in the collector circuit of the transistor 10, C is the capacitance of the capacitor 14, $I_2$ is the collector current of the transistor 12, $\beta$ is the current gain for the transistors 10 or 12, $I_1$ is the collector current of the transistor 10, $V_{be}$ is the base-emitter voltage of transistor 12, and $R_2$ is the parallel resistance of the resistors 22 and 28.

Since the circuit of the present invention provides an output pulse of an accurately defined duration $T_D'$, by coupling a differentiating circuit to the output terminal 34 of the circuit of FIG. 1, the trailing edge 72′ of the pulse 70′ may be differentiated to provide a spike voltage which occurs at an accurately defined time $T_D'$ after the input trigger signal. Thus, the circuit of the present invention may be used to provide a predetermined time delay.

It should also be observed that since a ramp waveform 63′ is developed at the emitter of the transistor 52, by connecting an output terminal to this point, the circuit of FIG. 1 may be used as a ramp, or sawtooth, generator which provides a ramp voltage of duration $T_D'$ in response to a trigger signal.

In addition, it will be apparent that numerous variations may be made in the circuit illustrated in FIG. 1 without departing from the principles of the invention. For example, a vacuum tube counterpart of the circuit may be provided, with a cathode follower arrangement in the jitter reduction circuitry 50. Also, PNP transistors may be employed instead of the illustrated NPN transistors, with opposite polarity bias voltages being applied to the terminals labeled $-E_b$ and $+E_{cc}$ of FIG. 1. Moreover, the capacitor 56 may be replaced by a zener diode. Thus, even though the invention has been illustrated and described with reference to a particular embodiment, numerous changes and alterations may be made therein by those skilled in the art to which the invention pertains without departing from the scope of the invention as set forth in the appended claims.

What is claimed is:

1. A monostable multivibrator comprising: first and second signal amplifying devices, each having a first electrode, a second electrode, and a control electrode; the first electrodes of said first and second amplifying devices being connected together; the second electrode of said second amplifying device being coupled to the control electrode of said first amplifying device; the second electrode of said first amplifying device being coupled to the control electrode of said second amplifying device; a first impedance element having first and second terminals, with said first terminal connected to the second electrode of said first amplifying device; a third signal amplifying device having a first electrode, a second electrode and a control electrode; the control electrode of said third amplifying device being connected to the second electrode of said first amplifying device; a second impedance element connected directly between the first electrode of said third amplifying device and the first electrodes of said first and second amplifying devices; the first electrode of said third amplifying device being coupled to said second terminal; and a unidirectionally conductive element connected directly between the second electrode of said third amylifying device and said second terminal.

2. A monostable multivibrator comprising: first and second transistors, each having an emitter electrode, a base electrode, and a collector electrode; the emitter electrodes being connected together; impedance means connected between the collector electrode of said second transistor and the base electrode of said first transistor; a capacitor connected between the collector electrode of said first transistor and the base electrode of said second transistor; a source of bias potential having one terminal connected to the emitter electrodes; a first impedance element connected between another terminal of said source of bias potential and the collector electrode of said second transistor; a second impedance element having first and second terminals; said first terminal being connected to the collector electrode of said first transistor; a third transistor having an emitter electrode, a base electrode, and a collector electrode; the base electrode of said third transistor being connected to the collector electrode of said first transistor; a third impedance element connected between the emitter electrode of said third transistor and the emitter electrodes of said first and second transistors; the emitter electrode of said third transistor being coupled to said second terminal; the collector electrode of said third transistor being connected to said another terminal; and a diode connected between said another terminal and said second terminal.

3. A ramp generator for responding to an input trigger signal to develop a ramp output signal of predetermined duration comprising: first, second, and third amplifying devices, each having a first electrode, a second electrode, and a control electrode; the first electrodes of said first and second amplifying devices being connected together; the second electrode of said second amplifying device being coupled to the control electrode of said first amplifying device; the second electrode of said first amplifying device being coupled to the control electrode of said second amplifying device; an impedance element having a first terminal and a second terminal, with said first terminal connected to the second electrode of said first amplifying device; means for applying an input trigger signal to the control electrode of said first amplifying device; the control electrode of said third amplifying device being coupled to the second electrode of said first amplifying device; impedance means coupled between the first electrode of said third amplifying device and the first electrodes of said first and second amplifying devices; the first electrode of said third amplifying device being coupled to said second terminal of said impedance element; a diode coupled between the second electrode of said third amplifying device and said second terminal of said impedance element; and means connected to the first electrode of said third amplifying device for providing said ramp output signal.

4. A ramp generator for responding to an input trigger signal to develop a ramp output signal of predetermined duration comprising: first, second and third transistors, each having an emitter electrode, a base electrode, and a collector electrode; the emitter electrodes of said first and second transistors being connected together; the collector electrode of said second transistor being coupled to the base electrode of said first transistor; the collector electrode of said first transistor being coupled to the base electrode of said second transistor; an impedance element having a first terminal and a second terminal, with said first terminal connected to the collector electrode of said first transistor; means for applying an input trigger signal to the base electrode of said first transistor; the base electrode of said third transistor being coupled to the collector electrode of said first transistor; impedance means coupled between the emitter electrode of said third transistor and the emitter electrodes of said first and second transistors; the emitter electrode of said third transistor being coupled to said second terminal of said impedance element; a diode coupled between the collector electrode of said third transistor and said second terminal of said impedance element; and means connected to the emitter electrode of said third transistor for providing said ramp output signal.

References Cited by the Examiner

UNITED STATES PATENTS 2,976,432 3/61 Geckle -------------- 307—88.5

ARTHUR GAUSS, *Primary Examiner.*